US010494084B2

(12) United States Patent
Garassino (10) Patent No.: US 10,494,084 B2
(45) Date of Patent: Dec. 3, 2019

(54) PROPELLER PITCH CONTROL SYSTEM

(71) Applicant: SAFRAN AIRCRAFT ENGINES, Paris (FR)

(72) Inventor: Alain Pierre Garassino, Crisenoy (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 238 days.

(21) Appl. No.: 15/471,185

(22) Filed: Mar. 28, 2017

(65) Prior Publication Data

US 2017/0283036 A1 Oct. 5, 2017

(30) Foreign Application Priority Data

Mar. 31, 2016 (FR) ..................... 16 52800

(51) Int. Cl.
*B64C 11/32* (2006.01)
*B64C 11/36* (2006.01)
*B64C 11/40* (2006.01)
*F16H 21/54* (2006.01)
*F16H 25/20* (2006.01)
*H02K 49/10* (2006.01)
*F16H 1/36* (2006.01)

(52) U.S. Cl.
CPC .............. *B64C 11/32* (2013.01); *B64C 11/36* (2013.01); *B64C 11/40* (2013.01); *F16H 21/54* (2013.01); *F16H 25/20* (2013.01); *H02K 49/102* (2013.01); *F16H 1/36* (2013.01)

(58) Field of Classification Search
CPC ......... B64C 11/30; B64C 11/32; B64C 11/36; F16H 21/54; F16H 25/20; F16H 1/36
See application file for complete search history.

(56) References Cited

U.S. PATENT DOCUMENTS 5,174,716 A * 12/1992 Hora ....................... B64C 11/32
416/129
8,167,553 B2 5/2012 Perkinson et al.
2011/0274545 A1 11/2011 Morgan

FOREIGN PATENT DOCUMENTS

EP 2 384 966 A2 11/2011
FR 925962 9/1947

OTHER PUBLICATIONS

French Preliminary Search Report dated Nov. 22, 2016 in French Application 16 52800 filed on Mar. 31, 2016 (with English Translation of Categories of Cited Documents).

* cited by examiner

*Primary Examiner* — Kenneth J Hansen
(74) *Attorney, Agent, or Firm* — Oblon, McClelland, Maier & Neustadt, L.L.P.

(57) ABSTRACT

A control system for controlling the pitch of a propeller, the system including a propeller shaft, a blade swivel device having a rotary control element suitable for placing the blades in an angular position corresponding to a desired propeller pitch, and a transmission presenting an outlet member coupled in rotation with the rotary control element of the blade swivel device. The transmission includes a variable speed drive having drive, control, and outlet rotors that are coupled in rotation respectively with the propeller shaft, with a control member, and with the outlet member of the transmission. With the variable speed drive, the speed of rotation of the outlet member of the transmission is a predetermined function of the speeds of rotation not only of the propeller shaft, but also of the control member.

17 Claims, 3 Drawing Sheets

PROPELLER PITCH CONTROL SYSTEM

FIELD OF THE INVENTION

The invention relates to a propeller pitch control system.

TECHNOLOGICAL BACKGROUND

In known manner, a propeller comprises a set of blades designed to be driven in rotation by a propeller shaft. With variable pitch propellers, each of the blades is configured to be capable of pivoting about its own longitudinal axis, which axis extends in a radial direction of the propeller.

A propeller pitch control system is designed to vary the pitch of the propeller, i.e. to vary the angle formed by its blades relative to the direction of the propeller axis, which is also the direction of the propeller shaft.

One such system is described by way of example in Document U.S. Pat. No. 8,167,553, having a FIG. 2 that is reproduced herewith as FIG. 1.

Figure 1:
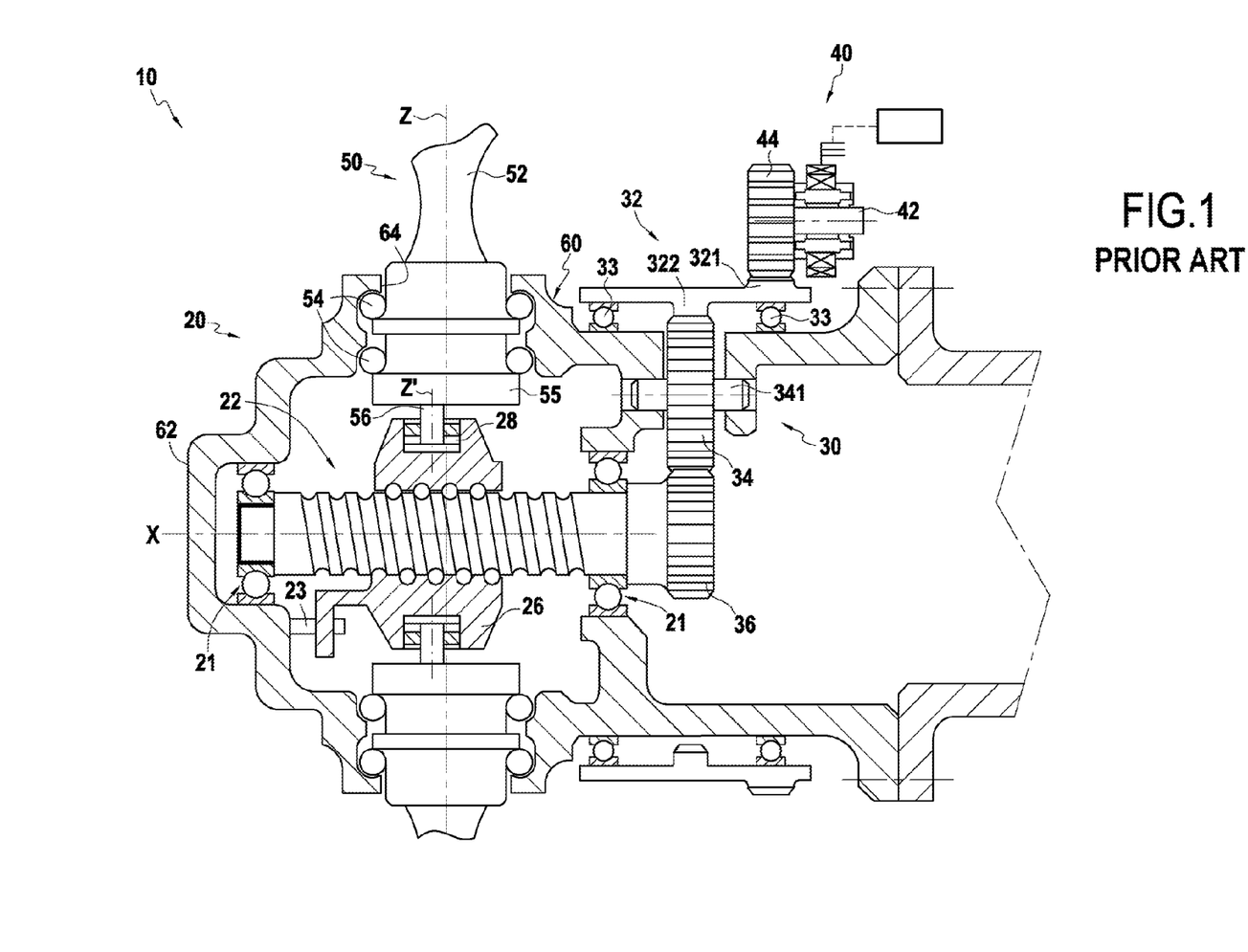
FIG. 1, described above, is a diagrammatic fragmentary longitudinal section view of an airplane propeller engine showing a prior art propeller pitch control system as disclosed in Document U.S. Pat. No. 8,167,553.

That document thus presents a propeller pitch control system 10 arranged in such a manner as to control the pitch of the propeller 50 of an airplane engine.

The propeller 50 has blades 52 mounted radially around a propeller shaft 60.

The propeller shaft 60 is a hollow shaft, with its end closed by a wall 62.

In the proximity of this end, in the periphery of the shaft 60, there are provided radial openings 64 for fastening blades. A respective blade 52 is fastened in each radial opening 64.

The blades 52 are fastened in such a manner as to be capable of pivoting about their respective longitudinal axes Z (which axes are radial for the propeller 50), via ball bearings 54.

The propeller pitch control system 10 includes a blade swivel device 20 for swiveling the blades.

The device 20 includes a rotary control element constituted by a wormscrew 22 arranged on the axis X of the propeller shaft 60. The wormscrew 22 is held in position inside the shaft 60 by ball bearings 21, which position is stationary other than the possibility of rotating about its axis X.

The blade swivel device 20 also has a nut 26 that is arranged on the wormscrew 22.

The nut 26 is connected to the propeller shaft so as to rotate permanently at exactly the same speed of rotation as the propeller shaft. In this embodiment, this connection is constituted by a retaining finger 23.

In addition, the nut 26 is connected to the blade so that the axial position of the nut (along the propeller axis X) determines the angular position of the blades.

For this purpose, each blade has a blade attachment finger 56. Each of these attachment fingers 56 extends radially from the root of the blade of which it forms a part along a radial attachment axis Z'.

Each attachment axis Z' is offset from the axis of the radial opening 64 for fastening the blade that is designed to receive the blade 52 of which the attachment finger 56 forms a part. Consequently, movement of the attachment finger 56 along the axial direction causes the blade 52 of which the finger 56 forms a part to turn about its pitch axis Z.

In order to actuate the fingers 56, the nut 26 has notches 28, with each notch 28 being designed to receive a blade attachment finger 56.

More precisely, the root of each of the blades 52 presents an off-center wrist-pin 55 that extends perpendicularly to the axis Z of the blade. The end of the wrist-pin 55 opposed to the axis Z presents a blade attachment finger 56 that projects from the wrist-pin along the radial direction Z' towards the propeller axis X. For each blade 52, the nut 26 has a notch 28 designed to receive the blade attachment finger 56 in question. When the nut 26 moves axially along the propeller axis X under the effect of the wormscrew 22 rotating, the attachment fingers 56 all move by the same amount. Under the effect of this movement, each of the blades 52 pivots about its pivot axis Z. This pivoting movement places the blades 52 in the desired angular position.

While the propeller is rotating, and in order to ensure that the propeller pitch remains constant, the speed of rotation of the wormscrew 22 thus needs to be exactly equal to the speed of rotation of the propeller 50, so as to avoid any movement of the nut 26 along the screw 22.

Conversely, in order to change the pitch of the propeller, there must be a difference between the speeds of rotation of the propeller and of the wormscrew 22.

The direction in which the pitch of the propeller changes thus depends on the relationship between the speed of rotation of the wormscrew 22 and the speed of rotation of the propeller shaft 60.

When the wormscrew 22 is driven to rotate at a speed faster than that of the shaft 60, the nut 26 moves in a first axial direction so as to vary the pitch of the propeller in a first direction; conversely, when the wormscrew 22 is driven in rotation at a speed less than that of the shaft 60, the nut moves in a second axial direction so as to cause the pitch of the propeller 50 to vary in the opposite direction.

The wormscrew 22 associated with the nut 26 thus constitutes a blade swivel device 20 enabling the blades 52 to be placed in a desired angular position, so that they occupy a position corresponding to the desired propeller pitch. The angular position of the wormscrew (more precisely its angular position relative to the propeller shaft 60) determines the pitch angle imposed on the blades 52.

In order to actuate the blade swivel device 20, the propeller pitch control system 10 also presents a transmission 30 that is driven by a motor 40. The motor 40 is an electric motor with a rotor 42 including in particular a shaft on which a gearwheel 44 is mounted.

The transmission 30 is constituted by an epicyclic geartrain. It transmits the torque transmitted via the gearwheel 44 to the wormscrew 22 (rotary control element of the blade swivel device 20).

The transmission 30 is constituted essentially by a ring 32 having two sets of teeth 321 and 322, which ring constitutes its inlet member, and by a single planet wheel 34 that constitutes its outlet member 34. The ring 32 is supported by the propeller shaft 60 by means of two ball bearings 33. The set of teeth 321 is an outside set of teeth meshing with the gearwheel 44: the gearwheel 44 of the rotor of the motor 40 drives the ring 32 via this set of teeth 321. The set of teeth 322 is an inside set of teeth meshing with the planet wheel 34. The planet wheel 34 is supported by the shaft 60; its axis 341 thus rotates together with the shaft 60.

The end of the wormscrew 22 that is remote from the wall 62 is constituted by a gearwheel 36. The teeth of this gearwheel mesh with the teeth of the planet wheel 34.

Thus, the rotation of the rotor 42 of the motor 40 is transmitted to the wormscrew 22 by means of the transmission 30. This transmission involves a transmission ratio R, i.e. the speed of rotation of the wormscrew 22 about the axis X is equal to the speed of rotation of the ring 32 multiplied by the coefficient R.

The term "transmission ratio" is used herein to mean the ratio of the speeds of rotation respectively of the member driven by the outlet member of the transmission and of the inlet member of the transmission.

The propeller pitch control system 10 is configured in such a manner that when the inlet member 32 of the transmission 30 is driven at an appropriate speed of rotation (which is a function of the speed of rotation of the shaft 60 and of the desired pitch), the transmission 30 drives the rotor 22 of the blade swivel device 20 at a speed of rotation such that the blade swivel device 20 places the blades 52 in the desired angular position.

The propeller pitch control system 10 serves to vary the pitch of the propeller 50 and thus to modify the power demand on the engine of the airplane.

Nevertheless, that system presents a drawback.

Specifically, it requires an electric motor to operate continuously in flight. Specifically, the motor 40 is operating at all times in order to drive the rotation of the wormscrew 22 and ensure that it has a speed of rotation that is equal to the speed of rotation of the propeller shaft 60, or that is at least close to that speed. As a result of operating continuously in that way, the control system 10 presents a high level of energy consumption and it presents wear that is relatively fast.

SUMMARY OF THE INVENTION

The object of the invention is to remedy that drawback and to propose a propeller pitch control system of the type described in the introduction but that presents reduced energy consumption and low wear.

This object is achieved by means of a control system for controlling the pitch of a propeller for a propeller having blades designed to be driven in rotation by a propeller shaft, each blade being configured to pivot about a substantially radial axis of the blade, the system comprising:
the propeller shaft;
a blade swivel device comprising a rotary control element suitable for placing the blades in an angular position corresponding to a desired propeller pitch as a function of rotation of said rotary control element relative to the propeller shaft; and
a transmission presenting an outlet member that is coupled to rotate with the rotary control element of the blade swivel device;
wherein:
the transmission includes a variable speed drive having a drive rotor, a control rotor, and an outlet rotor;
said drive, control, and outlet rotors are coupled to rotate respectively with a drive member that is the propeller shaft, with a control member, and with the outlet member of the transmission, and consequently the speeds of rotation of the drive, control, and outlet rotors are proportional respectively to the speeds of rotation of the drive, control, and transmission outlet members; and
the variable speed drive is configured to drive the outlet rotor in rotation at a speed that is a first predetermined function of the speeds of rotation of the drive and control rotors.

As a result, the speed of rotation of the outlet member of the transmission is a second predetermined function of the speeds of rotation of the drive and control members. This second function is deduced from the first function by taking account of the multiplicative coefficients that exist respectively between the speeds of rotation of the drive, control, and outlet rotors and the speeds of rotation of the drive, control, and outlet members of the transmission.

In this control system, the variable speed drive serves to drive the outlet member of the transmission, directly or indirectly. By means of the variable speed drive, the mechanical power delivered by the transmission no longer comes from the motor, or at least does not come only from the motor, but also comes at least in part from the propeller shaft. Consequently, compared with the above-described propeller pitch control system, the system of the invention advantageously enables energy consumption to be reduced.

The main difference between the propeller pitch control system of the invention, as defined above, and the system proposed by Document U.S. Pat. No. 8,167,553 lies in using a variable speed drive having two inlets, namely the drive rotor and the control rotor, which are coupled respectively to the drive and to the control members of the transmission, instead of merely transmitting the torque produced by an external motor (the motor 40).

The variable speed drive is a device comprising three rotors that are configured to be put into rotation relative to one another. The function of the variable speed drive is to drive the outlet rotor in such a manner that the speed of rotation of this rotor is a function (the "first" function) of the speeds of rotation of the two inlet rotors.

The drive rotors and the outlet rotor are coupled respectively to the drive and control members of the transmission and to the outlet member of the transmission. Furthermore, each of these rotors is either itself one of the drive, control, or outlet members, as the case may be, of the transmission, or else it is connected to one of the drive, control, or outlet members, as the case may be, of the transmission.

When two members are said herein to be coupled, that means that the respective speeds of rotation of the two coupled members at any instant are proportional to each other. This coupling may be implemented by any means (a gear, a geartrain, belts, . . . ), which means may in particular be mechanical, magnetic, etc.

The control system is arranged in such a manner that the drive member of the transmission is the propeller shaft; the control member of the transmission is designed to be driven by a motor or some other means, e.g. an electric motor. Since the drive member of the transmission is the propeller shaft, the control system of the invention can avoid consuming energy stored in the energy supplies of the machine (e.g. electrical energy stored in storage batteries).

The transmission is thus arranged in such a manner as to transmit the rotary motion of the propeller shaft to the rotary control element of the blade swivel device.

Advantageously, the transmission presents a controllable transmission ratio because of the presence of the variable speed drive with two inlets: the transmission ratio of the transmission can be controlled by varying the speed of rotation of the control member of the transmission, which is coupled with the control rotor of the variable speed drive.

In one embodiment, the blade swivel device is arranged in such a manner that when the speeds of rotation of the propeller shaft and of the rotary control element of the blade swivel device are equal, then the propeller pitch does not vary. Advantageously, this embodiment enables the transmission ratio of the transmission to vary over a range situated around the value 1.

In this embodiment, the propeller pitch is controlled by the control system as follows.

If it is desired to conserve a propeller pitch that is constant, then the control member of the transmission is driven in rotation in such a manner that the transmission ratio is equal to one. The transmission then drives the rotary control element of the blade swivel device in rotation at the same speed as the propeller shaft, so the propeller pitch remains unchanged.

Conversely, by varying the transmission ratio so that it is greater than or less than one, action is taken on the rotary control element of the blade swivel device so as to cause the pitch of the propeller to change.

In an embodiment, the outlet rotor is coupled to rotate with the outlet member via a gear ratio device. In particular, this device may present a ratio S lying in the range 0.2 to 5, and more preferably in the range 0.6 to 2.

In an embodiment, the transmission is arranged so that when the speed of rotation of the control member is zero, the rotary control element of the blade swivel device is driven at a speed of rotation for which the propeller pitch does not vary.

By means of this arrangement, when it is desired to keep a propeller pitch constant, there is no need to actuate the transmission control member; in other words, if this member is actuated by a motor, there is then no need to actuate the motor. Consequently, and advantageously in this embodiment, the transmission does not consume any power during stages in which the pitch of the propeller is kept constant (or at least does not consume any power drawn by the control member of the variable speed drive).

When the blade swivel device is arranged so that the speeds of rotation of the propeller shaft and of the rotary control element of the blade swivel device are equal, the propeller pitch does not vary, with this property being obtained as follows.

Under such circumstances, the transmission needs to be arranged so that its transmission ratio is equal to one when the speed of rotation of the control member is zero. Thus, the speed of rotation of the outlet member is equal to the speed of rotation of the drive member (i.e. the propeller shaft) when the speed of rotation of the control member is zero; under such conditions, the propeller pitch does not vary.

In an embodiment, the transmission is arranged in such a manner that the speed of rotation of the outlet member is the sum of the speed of rotation of the drive member plus a value that is a function of the speed of rotation of the control member. This value may in particular be proportional to the speed of rotation of the control member.

Preferably, the value that is a function of the speed of rotation of the control member is zero when the speed of rotation of the control member is zero: it then follows that the speed of rotation of the outlet member, and thus of the rotary control element controlling the changes of pitch of the propeller, is equal to the speed of rotation of the propeller shaft when the speed of rotation of the control member is zero.

This property is naturally particularly advantageous when the blade swivel device is arranged in such a manner that when the speeds of rotation of the propeller shaft and of the rotary control element of the blade swivel device are equal, then the propeller pitch does not vary.

Various embodiments can be adopted for the blade swivel device.

In an embodiment, the rotary control element of the blade swivel device is a wormscrew, and the blade swivel device further includes a nut arranged on the wormscrew.

This nut is configured to be connected to the blades in such a manner that the axial position of the nut determines the angular positions of the blades. The nut is designed to move axially along the wormscrew when the wormscrew is caused to rotate about its longitudinal axis.

In order to swivel the blades, in a preferred embodiment, the nut includes notches, each notch being configured to receive a blade attachment finger extending radially from a blade root along a radial attachment axis, and each attachment axis being offset relative to a radial opening for fastening the blade that is arranged in the periphery of the propeller shaft.

The blade swivel device may in particular be analogous to the device disclosed in above-mentioned U.S. Pat. No. 8,167,553.

In another embodiment, said rotary control element of the blade swivel device is a pitch adjustment rotor including one radial actuator rod for each blade, each actuator rod being configured to engage a blade and to impart a desired angular position thereto. A blade swivel device of this type is disclosed by way of example in patent FR 2 992 376.

In one possibility concerning the above-mentioned embodiment, the propeller shaft also has a radial finger for each of the blades, each radial finger being engaged with a blade so as to constrain said blade to pivot about the axis of the radial finger; and for each blade, the actuator rod and the radial finger associated with the blade are situated axially at a distance apart from each other, so that rotation of the pitch adjustment rotor relative to the propeller shaft imparts a corresponding rotation on the blades about the axes of said radial fingers.

Various embodiments may also be adopted for the transmission.

In an embodiment, the transmission is arranged in such a manner that the drive member and the member driven by the outlet member of the transmission necessarily rotate in the same direction (it is thus assumed implicitly that their axes of rotation are parallel). The transmission ratio of the transmission is thus positive. This arrangement is optional but it makes the transmission easier to make.

In an embodiment, when the outlet rotor is coupled in rotation with the outlet member via a geartrain, the variable speed drive and the geartrain are preferably arranged in such a manner that when the speed of rotation of the control member is zero, the transmission ratio (S) of the variable speed drive is equal to the reciprocal of the transmission ratio (R) of the geartrain. This arrangement is naturally particularly advantageous when the blade swivel device is arranged in such a manner that when the speeds of rotation of the propeller shaft and of the rotary control element of the blade swivel device are equal, then the pitch of the propeller does not vary.

In an embodiment, the variable speed drive comprises a rotary mechanical differential. An example of a rotary differential that is suitable for use is disclosed in Document U.S. Pat. No. 6,547,689. A rotary differential is a gear device having three coaxial rotors that are configured to be set into rotation relative to one another. The rotary differential is configured so that the speed of rotation of the outlet rotor is a function of the speeds of rotation of the two inlet rotors.

In another embodiment, the variable speed drive comprises a magnetic gear. An example of a magnetic gear suitable for use is disclosed in Document US 2011/0037333.

In this embodiment, the three rotors of the variable speed drive (drive, control, and outlet rotors) are arranged coaxially and they constitute an inner rotor, an intermediate rotor, and an outer rotor, in the same order or in some other order. The intermediate rotor has magnetic poles interposed between the inner and outer rotors. In the magnetic gear, the speeds of rotation of the three rotors are related by a predetermined relationship.

By way of example, in the gear disclosed in Document US 2011/0037333, the speeds of rotation of the three rotors are related by the following relationship:

$$Wi+GWo-(1+G)Wp=0 \quad (1)$$

where Wi, Wo, and Wp are the respective speeds of rotation of the inner, outer, and intermediate rotors.

On the basis of the equation relating the speeds of rotation of the three rotors of the variable speed drive, in a propeller pitch control system of the invention having a magnetic gear, the speed of rotation of the outlet member of the transmission can be determined as a function of the speeds of rotation of the drive and control members. Where appropriate, it may also be necessary to have knowledge as well of the multiplicative coefficients relating respectively the speeds of rotation of the drive, control, and outlet rotors of the variable speed drive with respect respectively to the speeds of rotation of the drive, control, and outlet members of the transmission.

When the variable speed drive is a magnetic gear, it results from equation (1) that the speed of rotation of the outlet member of the transmission is the sum of a first term proportional to the speed of rotation of the drive member plus a second term proportional to the speed of rotation of the control member. Under such circumstances, and advantageously, the second term (function of the speed of rotation of the control member) is zero when the speed of rotation of the control member is zero.

The transmission may in particular be arranged in such a manner that the first term is equal to the speed of rotation of the drive member when—as in the example described—, the blade swivel device is arranged in such a manner that when the speeds of rotation of the propeller shaft and of the rotary control element of the blade swivel device are equal, the pitch of the propeller does not vary.

The rotors of the magnetic gear may be arranged in other ways, in particular with respect to the drive and control members of the transmission.

In an embodiment, said drive, control, and outlet rotors are coaxial, and of them, the control rotor, is the outer rotor. The term "outer" rotor is used herein to mean that one of the rotors of the variable speed drive that has the largest radius.

In an embodiment, the variable speed drive comprises three coaxial rotors, an inner rotor constituting the drive rotor, and an intermediate rotor constituting the outlet rotor.

In another embodiment, the variable speed drive comprises three coaxial rotors, an intermediate rotor constituting the drive rotor, and an inner rotor constituting the outlet rotor.

As mentioned above, each of the rotors may be connected to the drive, control, or outlet member of the transmission, as appropriate, by various means.

In an embodiment, the outlet rotor is coupled to rotate with the outlet member via an epicyclic geartrain having two planet gears meshing with each other, carried by the propeller shaft, and meshing respectively with the outlet rotor of the variable speed drive and with the outlet member of the transmission. In an embodiment, the variable speed drive and the geartrain are arranged in such a manner that when the speed of rotation of the control member is zero, the transmission ratio (S) of the magnetic gear is equal to the reciprocal of the transmission ratio of the geartrain. (The term "transmission ratio" is used herein to mean the ratio between the speed of rotation of a member driven by the outlet member and the speed of rotation of the inlet member of a transmission.)

Consequently, the speed of rotation of the member driven by the outlet member of the transmission is equal to the speed of rotation of the propeller shaft when the speed of rotation of the control member is zero.

The control system of the invention may be used for propellers in air or in water. It can be integrated in a machine, for instance a turbine engine, in particular an aeroengine.

The invention also relates to a propeller engine having a propeller and a control system as defined above. The invention also relates to an aircraft or a watercraft, e.g. a surface vessel or a submarine, including one or more engines of this type.

BRIEF DESCRIPTION OF THE DRAWINGS

The invention can be well understood and its advantages appear better on reading the following detailed description of embodiments given as non-limiting examples. The description refers to the accompanying drawings, in which.

DETAILED DESCRIPTION OF THE INVENTION

In the figures, elements that are identical or similar are either given the same references or else they are given references that differ by a multiple of 100.

Figure 2:
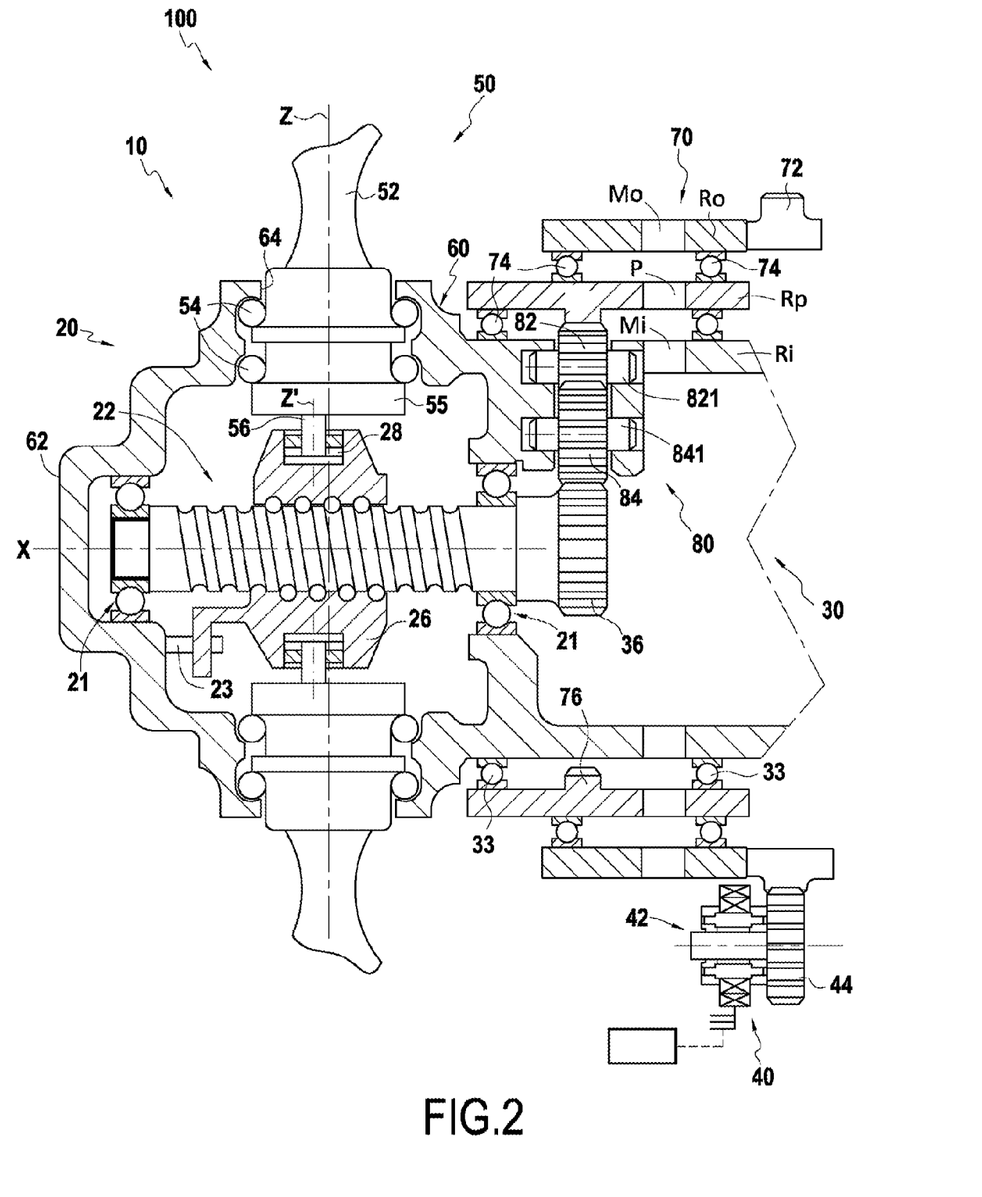
FIG. 2 is a diagrammatic fragmentary longitudinal section view of a propeller engine including a system for controlling the pitch of the blades of the propeller in a first embodiment of the invention.

FIG. 2 shows an airplane propeller engine 100 having a propeller pitch control system 10 representing a first embodiment of the invention.

The system 10 presents a general arrangement that is quite similar to that of the system described with reference to FIG. 1; thus, the system 10 is not described in detail and the details of the description below relate to characteristics associated with the present invention.

In this embodiment, the system 10 has a blade swivel device 20 identical to that described with reference to FIG. 1, serving to modify the pitch of each of the blades by pivoting them about their longitudinal axes. Any blade swivel system performing the blade swivel function can be used in the context of the invention.

The system 10 also includes a transmission 30 that is arranged differently from the transmission of the control system described with reference to FIG. 1.

In this embodiment, the transmission 30 includes a variable speed drive 70 and a geartrain 80.

The variable speed drive is constituted by a magnetic gear made up of three coaxial rotors, namely an outer rotor Ro, an intermediate rotor Rp, and an inner rotor Ri.

The outer rotor Ro, which is of radius greater than the rotors Ri and Rp, is the control rotor. It is formed by a portion of a cylindrical tube placed coaxially outside the propeller shaft 60, and it carries an outside set of teeth 72. This outside set of teeth 72 meshes with the teeth of the gearwheel 44 of the outlet rotor 42 of an electric motor 40. The motor 40 can thus drive the rotor Ro in rotation.

The intermediate rotor Rp is the outlet rotor. It is likewise formed by a portion of cylindrical tube placed coaxially outside the propeller shaft 60.

The inner rotor Ri is the drive rotor. It is formed by the propeller shaft, and more precisely by the portion of the propeller shaft 60 that is situated in register with the intermediate rotor Rp.

Permanent magnets Mo and Mi are fastened respectively in the outer rotor Ro and the inner rotor Ri (shaft 60). Magnetic poles P are placed in the intermediate rotor Rp. Ball bearings 74 are arranged respectively between the shaft 60 and the intermediate rotor Rp, and between the intermediate rotor Rp and the outer rotor Ro, in order to allow relative rotation between them.

The inner, outer, and intermediate rotors Ri, Ro, and Rp are configured so as to constitute a magnetic gear 70.

When the motor 40 is actuated, its gearwheel 44 rotates and causes the control rotor or outer rotor Ro to rotate at a speed Wo.

The propeller shaft rotates at a certain speed Wi; it drives the propeller 50 at this speed.

Under the effect of the rotation of the inner rotor Ri at a speed Wi, and of the outer rotor at a speed Wo, the outlet rotor Rp of the gear 70 is driven in rotation at a speed Wp. This speed Wp can be deduced from the speeds Wo and Wi using formula (1).

The geartrain 80 mainly comprises two planet gears 82 and 84 arranged respectively about a shaft 821 and a shaft 841. The ends of these shafts are placed in bores arranged in the propeller shaft 60, which means that the shafts 821 and 841 are both driven in rotation by the shaft 60. In this embodiment, the use of two planet gears 82 and 84 causes the member driven by the outlet member of the transmission, namely the wormscrew 22, to rotate necessarily in the same direction as the drive member of the transmission, namely the propeller shaft 60.

The outlet rotor or intermediate rotor Rp has an inside set of teeth 76 meshing with the teeth of the planet wheel 82. The same teeth mesh in turn with the teeth of the planet wheel 84. The teeth of the planet wheel 84 mesh in turn with the teeth of the gearwheel 36 of the wormscrew 22.

Consequently, the planet wheel 84 of the geartrain 80 (outlet member of the transmission 30) transmits rotation from the outlet rotor Ri of the variable speed drive 70 (magnetic bearing 70) to the wormscrew 22, which constitutes the rotary control element of the blade swivel device 20.

The geartrain 80 is designed to have a transmission ratio equal to R, which ratio is equal to the ratio of the speeds of rotation of the wormscrew 22 (member driven by the outlet member of the transmission 30, i.e. the planet wheel 84) relative to the inlet member of the geartrain 80, i.e. the planet wheel 82.

Let the transmission ratio of the variable speed drive (relative to its drive member) be written S: this is the ratio of the speeds of rotation of the planet wheel 82 (member driven by the outlet member of the variable speed drive) relative to the drive member, the propeller shaft 60.

The overall transmission ratio of the transmission 30, including both the variable speed drive 70 and the geartrain 80, i.e. equal to the ratio of the speed of rotation of the wormscrew 22 relative to the speed of rotation of the propeller shaft 60, is equal to the product S×R.

In the embodiment described, the transmission 30 is arranged in such a manner that when the control rotor Ro is stopped, and remains in a stationary position (speed of rotation Wo zero), then the transmission ratio S of the variable speed drive 70 and the transmission ratio R of the geartrain 80 are reciprocals of each other (S×R=1).

Furthermore, the blade swivel device 20 is arranged in such a manner that when the speeds of rotation of the propeller shaft 60 and of the wormscrew 22 (rotary control element of the blade swivel device 20) are equal, then the propeller pitch does not vary.

Consequently, when the motor 40 is stopped, the wormscrew 22 is driven by the transmission 30 at exactly the same speed as the propeller shaft 60. Consequently, when the motor 40 is stopped, the propeller pitch remains constant.

Conversely, when the motor 40 is caused to rotate, that leads to a variation in the transmission ratio S of the variable speed drive 70. The product S×R is then no longer equal to 1, and consequently there is variation in the speed of rotation of the wormscrew 22. The difference in speed of rotation between the propeller shaft 60 and the wormscrew 22 thus causes the nut 26 to move, and consequently leads to the blades 52 swiveling, and thus to a change in the pitch of the propeller 50.

Figure 3:
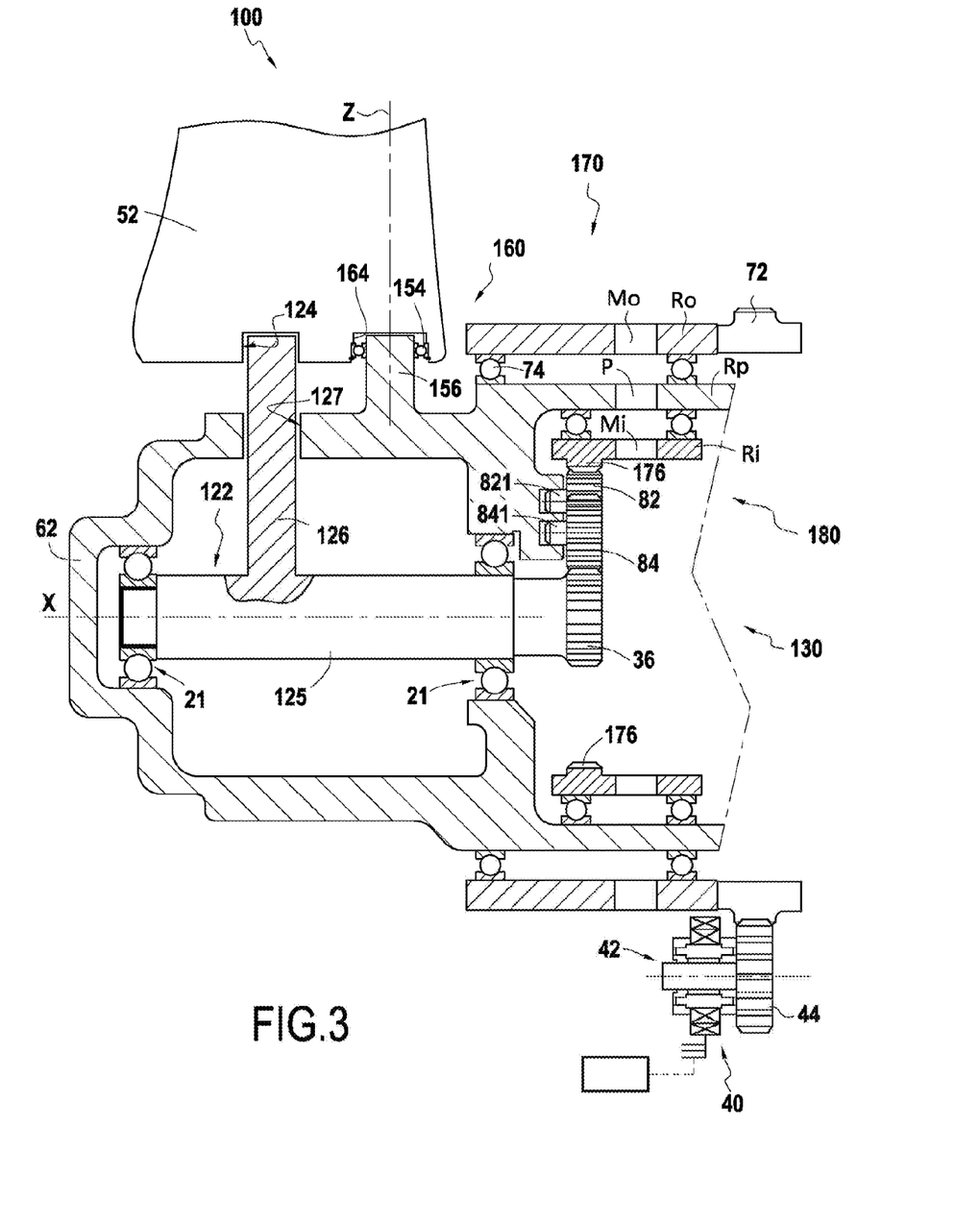
FIG. 3 is a diagrammatic fragmentary longitudinal section view of a propeller engine including a system for controlling the pitch of the blades of the propeller, in a second embodiment of the invention.

A second embodiment of the invention is described below with reference to FIG. 3.

This embodiment differs from the first embodiment in two respects: the blade swivel device 120 and the transmission 130.

In this embodiment, the blade swivel device is similar to that disclosed in Document FR 2 992 376.

Thus, whereas in the blade swivel device described with reference to FIG. 2, the blades were caused to swivel by axial movement of the nut 26 along the propeller axis X, in contrast, in the present embodiment the blades are caused to swivel by a movement in rotation, namely directly by turning a shaft 122 having radial actuator rods 126. The shaft 122 thus constitutes a pitch adjustment rotor in the meaning of the invention.

In particular, the shaft 122 is constrained to move in rotation with the transmission outlet member (planet wheel 84); it is configured in such a manner that its angular position relative to the propeller 50 determines the angular positions of the blades 52.

For this purpose, each of the blades 52 presents a radial bore 164 in its root. The propeller shaft 160 presents radial drive fingers 156. The radial fingers 156 are arranged in such a manner that each blade 52 can be engaged on a radial finger 156. The blades 52 are held in position relative to the radial fingers 156 in the bores 164 by ball bearings 154. These bearings enable the blades 52 to pivot about the axes of the radial fingers 156.

The pitch of the propeller 50 is adjusted by means of the pitch adjustment rotor, i.e. the shaft 122.

This shaft is held coaxially inside the propeller shaft 160 by ball bearings 21.

At its end remote from the wall 62, the shaft presents a gearwheel 36 identical to the gearwheel of the first embodiment. This gearwheel 36 is coupled to rotate with the planet wheel 84, which constitutes the outlet member of the transmission 30. The shaft 122 thus constitutes the rotary control element of the blade swivel device 120.

In order to cause the angular orientation of the blades 52 to vary, the shaft 122 is configured as follows.

For each of the blades 52, it has a radial actuator rod 126. Each of these rods 126 projects from the shank 125 of the shaft 122 and passes through an oblong hole 127 formed in the shaft 160 (one oblong hole for each rod 126; the circumferential extent of the oblong hole is determined as a function of the amplitude of the angular pivoting of the shaft 122); and it extends into a bore 124 formed in the root of the blade 52.

When the shaft 122 turns about its axis X, the rods 126 perform the same movement in rotation.

Consequently, controlling the angular position of the shaft 122 serves to adjust the pitch of the propeller 50, as follows.

For the pitch of the propeller to remain constant, the shaft 122 must be driven in rotation at the same speed as the propeller shaft 160. Under such circumstances, there is no relative movement of the rods 126 relative to the propeller 50, i.e. relative to the blades 52.

Conversely, in order to change the pitch of the propeller, it suffices to reduce or increase the speed of rotation of the shaft 122 a little relative to that of the propeller 50 (i.e. relative to the shaft 160) such that an angular offset occurs between the shaft 160 and the shaft 122.

When this angular offset occurs, the rods 126 engage the root of the blades 52 and thus cause them to pivot about their respective pivot axes Z, which are the axes of the radial drive fingers 156. Consequently, the angular offset of the shaft 122 relative to the propeller 50 causes the orientation of the blades 52 to be changed, i.e. changes the pitch of the propeller.

Thus, the angular position of the shaft 122, acting as a pitch adjustment rotor, relative to the propeller 50 determines the angular positions of the blades 52.

In this second embodiment, the transmission 130 has a variable speed drive 170 and a geartrain 180 that are arranged in a manner different from the first embodiment.

As in the first embodiment, the variable speed drive 170 is constituted by a magnetic gear having three coaxial rotors, namely an outer rotor Ro, an intermediate rotor Rp, and an inner rotor Ri. Nevertheless, the functions of the inner and intermediate rotors are interchanged.

The outer rotor Ro is the control rotor. It is formed by a portion of cylindrical tube placed axially outside the propeller shaft 60 and carrying an outside set of teeth 72. These outside teeth 72 mesh with the teeth of the wheel 44 of the outlet rotor 42 of an electric motor 40. Thus, the motor 40 serves to drive the rotor Ro in rotation.

The inner rotor Ri is the outlet rotor. It is formed by a portion of cylindrical tube placed coaxially inside the propeller shaft 60.

The intermediate rotor Rp is the drive rotor. It is formed by the portion of the propeller shaft 160 that is situated in register with the inner and outer rotors Ri and Ro.

Permanent magnets Mo and Mi are fastened respectively in the outer rotor Ro and the inner rotor Ri (the shaft 60). Magnetic poles P are placed in the intermediate rotor Rp. Ball bearings 74 are arranged respectively between the shaft 160 and the intermediate rotor Rp, and between the intermediate rotor Rp and the outer rotor Ro, in order to enable relative rotation therebetween.

The inner, outer, and intermediate rotors Ri, Ro, and Rp are configured so as to constitute the magnetic gear 170.

When the motor 40 is actuated, its gearwheel 44 rotates and causes the control rotor or outer rotor Ro to rotate at a speed Wo.

The propeller shaft rotates at a certain speed Wp; it drives the propeller 50 at that speed.

Under the effect of the rotation of the intermediate rotor Rp at the speed Wp, and of the outer rotor at a speed Wo, the outlet rotor Ri of the magnetic gear drive 170 is driven in rotation at a speed Wi. This speed is deduced from the speeds Wo and Wp using the formula (1).

The geartrain 180 mainly comprises two planet wheels 82 and 84 that are arranged about respective shafts 821 and 841 supported by the propeller shaft 160.

The difference between the geartrain 80 and the geartrain 180 lies in particular in the fact that the geartrain 180 is driven by the inner rotor Ri of the magnetic gear 170, whereas the geartrain 80 is driven by the intermediate rotor of the magnetic gear 70.

The intermediate rotor Ri has an inside set of teeth 176 meshing with the teeth of the planet wheel 82. These teeth mesh in turn with the teeth of the planet wheel 84. The teeth of the planet wheel 84 mesh in turn with the teeth of the gearwheel 36 of the shaft 122.

Consequently, the planet wheel 84 of the geartrain 180 (outlet member of the transmission 130) transmits the rotation of the outlet rotor Ri of the variable speed drive 170 (the magnetic gear 170) to the shaft 122, i.e. the rotary control element of the blade swivel device 120.

The geartrain 180 is designed to have a transmission ratio equal to R, which ratio is equal to the ratio of the speed of rotation of the shaft 122 relative to the speed of rotation of the planet wheel 82.

Once more, let the transmission ratio of the variable speed drive as determined between the planet wheel 82 driven by the outlet member Ri of the variable speed drive 170 and the drive member of the variable speed drive, namely the propeller shaft 60, be written S.

The overall transmission ratio combining both the variable speed drive 170 and the geartrain 180 as measured between the propeller shaft 60 and the shaft 122 is equal to the product S×R.

As in the preceding embodiment, in this second embodiment, when the control rotor Ro is in a fixed position (speed of rotation Wo zero), the transmission ratios S of the variable speed drive 170 and R of the geartrain 180 are advantageously reciprocals of each other (S×R=1).

Consequently, when the motor 40 is stopped, the shaft 122 is driven by the transmission 130 at the same speed as the propeller shaft 60, and the propeller pitch remains constant.

Conversely, when the motor 40 rotates, the shaft 122 is driven in rotation at a speed that is slightly greater or slightly smaller than the speed of the propeller shaft 60. As described above, this rotation leads to an angular offset of the shaft 122 (i.e. the fingers 126) relative to the propeller shaft 160 (radial fingers 156). This angular offset causes the pitch of the propeller to change.

Although the present invention is described with reference to specific embodiments, it is clear that various modifications and changes may be undertaken on those embodiments without going beyond the general ambit of the invention as defined by the claims. In addition, individual characteristics of the various embodiments mentioned may be combined in additional embodiments. Consequently, the description and the drawings should be considered in a sense that is illustrative rather than restrictive.

The invention claimed is:

1. A control system for controlling pitch of a propeller, the propeller having blades designed to be driven in rotation by a propeller shaft, each blade being configured to pivot about a substantially radial axis of the blade, the system comprising:
   the propeller shaft;
   a blade swivel device comprising a rotary control element suitable for placing the blades in an angular position corresponding to a desired propeller pitch as a function of rotation of said rotary control element relative to the propeller shaft;

a transmission presenting an outlet member that is coupled to rotate with the rotary control element of the blade swivel device; and
a variable speed drive;
wherein
the variable speed drive has a drive rotor, a control rotor, and an outlet rotor;
said drive, control, and outlet rotors are coupled to rotate respectively with a drive member that is the propeller shaft, with a control member, and with the outlet member of the transmission, and consequently speeds of rotation of the drive, control, and outlet rotors are proportional respectively to the speeds of rotation of the drive, control, and said outlet members of the transmission;
the variable speed drive is configured to drive the outlet rotor in rotation at a speed that is a predetermined function of the speeds of rotation of the drive and control rotors; and
the outlet rotor is coupled to rotate with the outlet member via an epicyclic geartrain having two planet gears meshing with each other, carried by the propeller shaft, and meshing respectively with the outlet rotor of the variable speed drive and with the outlet member of the transmission.

2. The control system according to claim 1, arranged in such a manner that the drive member and the rotary control element of the blade swivel device driven by the outlet member of the transmission necessarily rotate in the same direction.

3. The control system according to claim 1, wherein the rotary control element of the blade swivel device is a wormscrew, and the blade swivel device further includes a nut arranged on the wormscrew.

4. The control system according to claim 3, wherein the nut includes notches, each notch is configured to receive a blade attachment finger extending radially from a blade root along a radial attachment axis, and each attachment axis is offset relative to a radial opening for fastening the blade that is arranged in the periphery of the propeller shaft.

5. The control system according to claim 1, wherein said rotary control element of the blade swivel device is a pitch adjustment rotor including one radial actuator rod for each blade, each actuator rod being configured to engage a blade and to impart a desired angular position thereto.

6. The control system according to claim 1, wherein the transmission is arranged in such a manner that the speed of rotation of the outlet member is the sum of the speed of rotation of the drive member plus a value that is a function of the speed of rotation of the control member.

7. A propeller engine having a propeller and a control system according to claim 1.

8. A control system for controlling pitch of a propeller, the propeller having blades designed to be driven in rotation by a propeller shaft, each blade being configured to pivot about a substantially radial axis of the blade, the system comprising:
the propeller shaft;
a blade swivel device comprising a rotary control element suitable for placing the blades in an angular position corresponding to a desired propeller pitch as a function of rotation of said rotary control element relative to the propeller shaft;
a transmission presenting an outlet member that is coupled to rotate with the rotary control element of the blade swivel device; and
a variable speed drive;
wherein
the variable speed drive has a drive rotor, a control rotor, and an outlet rotor;
said drive, control, and outlet rotors are coupled to rotate respectively with a drive member that is the propeller shaft, with a control member, and with the outlet member of the transmission, and consequently speeds of rotation of the drive, control, and outlet rotors are proportional respectively to the speeds of rotation of the drive, control, and outlet members of the transmission;
the variable speed drive is configured to drive the outlet rotor in rotation at a speed that is a predetermined function of the speeds of rotation of the drive and control rotors; and
the variable speed drive comprises a magnetic gear.

9. A propeller engine having a propeller and a control system according to claim 8.

10. The control system according to claim 8, wherein the rotary control element of the blade swivel device is a wormscrew, and the blade swivel device further includes a nut arranged on the wormscrew.

11. The control system according to claim 8, wherein said rotary control element of the blade swivel device is a pitch adjustment rotor including one radial actuator rod for each blade, each actuator rod being configured to engage a blade and to impart a desired angular position thereto.

12. A control system for controlling pitch of a propeller, the propeller having blades designed to be driven in rotation by a propeller shaft, each blade being configured to pivot about a substantially radial axis of the blade, the system comprising:
the propeller shaft;
a blade swivel device comprising a rotary control element suitable for placing the blades in an angular position corresponding to a desired propeller pitch as a function of rotation of said rotary control element relative to the propeller shaft;
a transmission presenting an outlet member that is coupled to rotate with the rotary control element of the blade swivel device; and
a variable speed drive;
wherein
the variable speed drive has a drive rotor, a control rotor, and an outlet rotor;
said drive, control, and outlet rotors are coupled to rotate respectively with a drive member that is the propeller shaft, with a control member, and with the outlet member of the transmission, and consequently speeds of rotation of the drive, control, and outlet rotors are proportional respectively to the speeds of rotation of the drive, control, and outlet members of the transmission;
the variable speed drive is configured to drive the outlet rotor in rotation at a speed that is a predetermined function of the speeds of rotation of the drive and control rotors; and
said drive, control, and outlet rotors are coaxial, and of them, the control rotor, is an outer rotor.

13. The control system according to claim 12, wherein the drive, control, and outlet rotors are coaxially arranged with the outlet rotor arranged between the control and drive rotors.

14. The control system according to claim 12, wherein the drive, control, and outlet rotors are coaxially arranged with the drive rotor arranged between the control and outlet rotors.

15. A propeller engine having a propeller and a control system according to claim 12.

16. The control system according to claim 12, wherein the rotary control element of the blade swivel device is a wormscrew, and the blade swivel device further includes a nut arranged on the wormscrew.

17. The control system according to claim 12, wherein said rotary control element of the blade swivel device is a pitch adjustment rotor including one radial actuator rod for each blade, each actuator rod being configured to engage a blade and to impart a desired angular position thereto.

* * * * *